April 25, 1967
W. STRIEN ETAL
3,315,298
HINGE FITTING FOR ADJUSTING THE INCLINATION OF THE BACK
REST OF A SEAT, ESPECIALLY OF A MOTOR VEHICLE
Filed Dec. 12, 1963
8 Sheets-Sheet 6
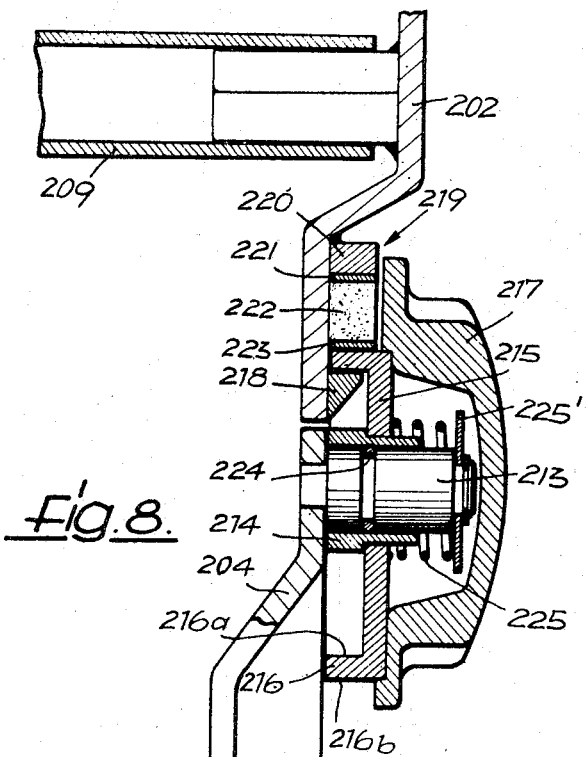
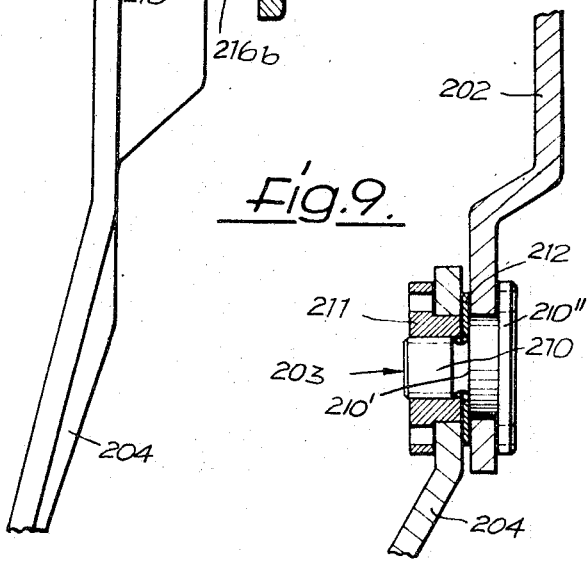
Inventors

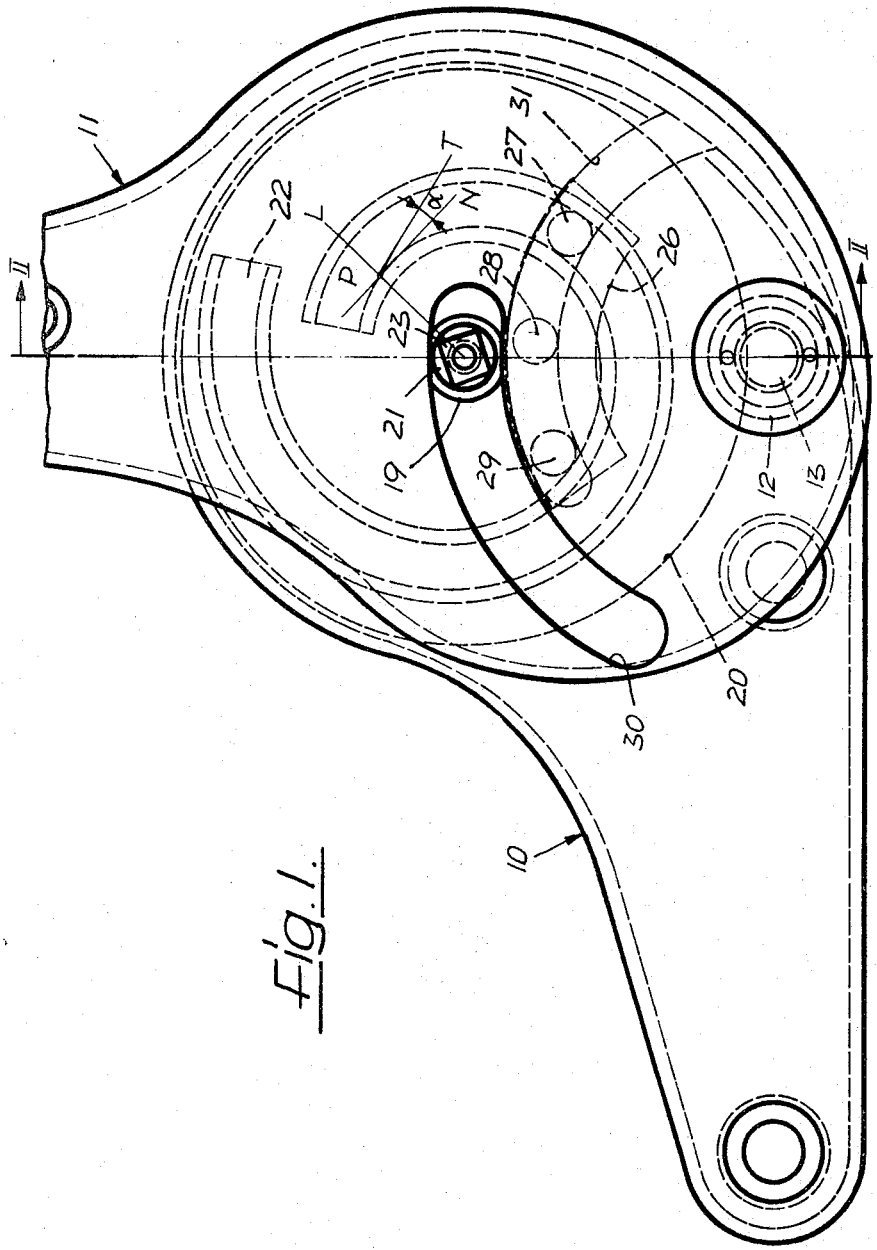

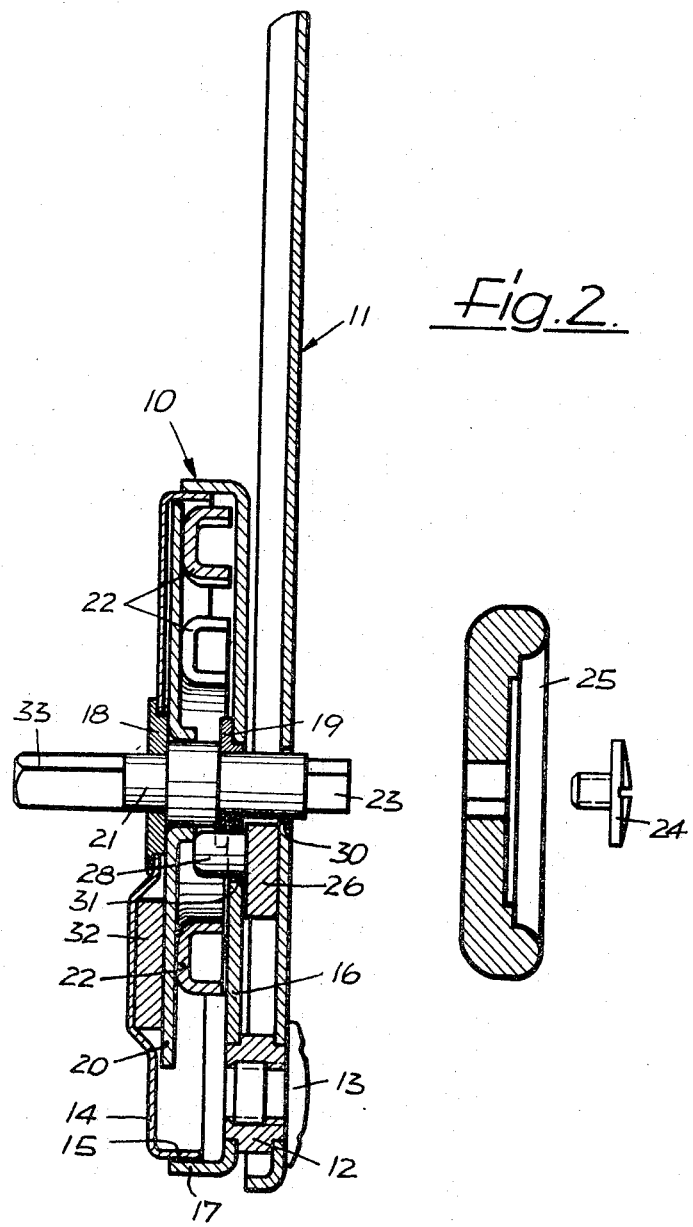

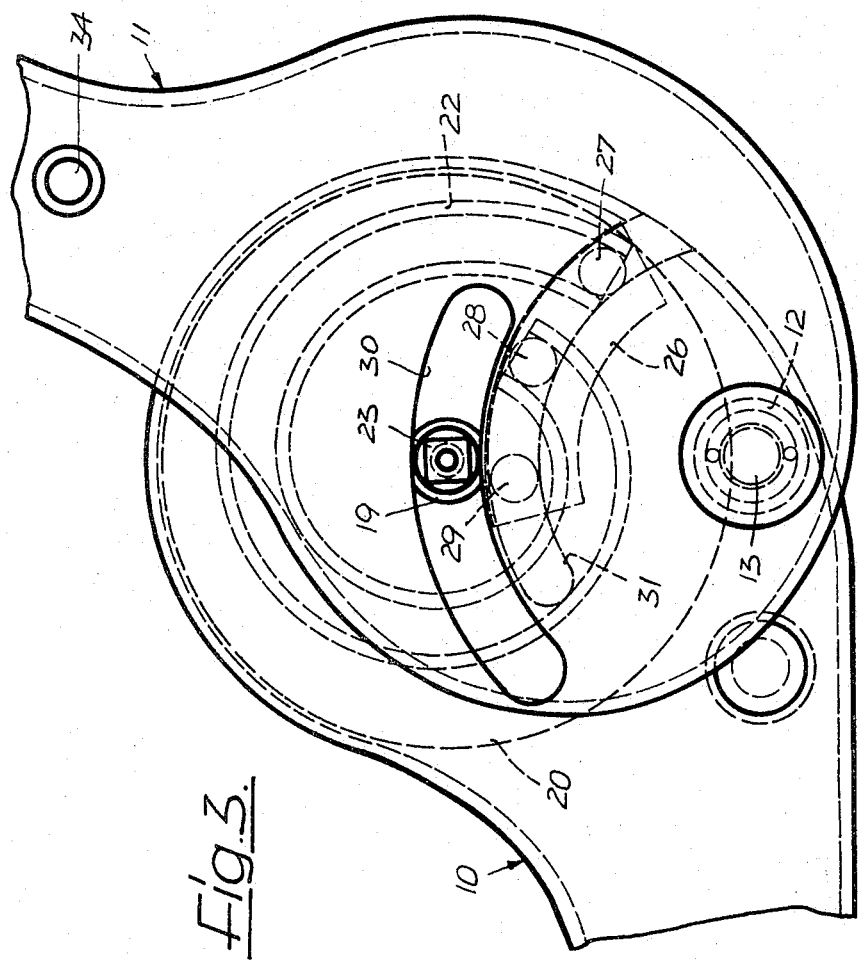

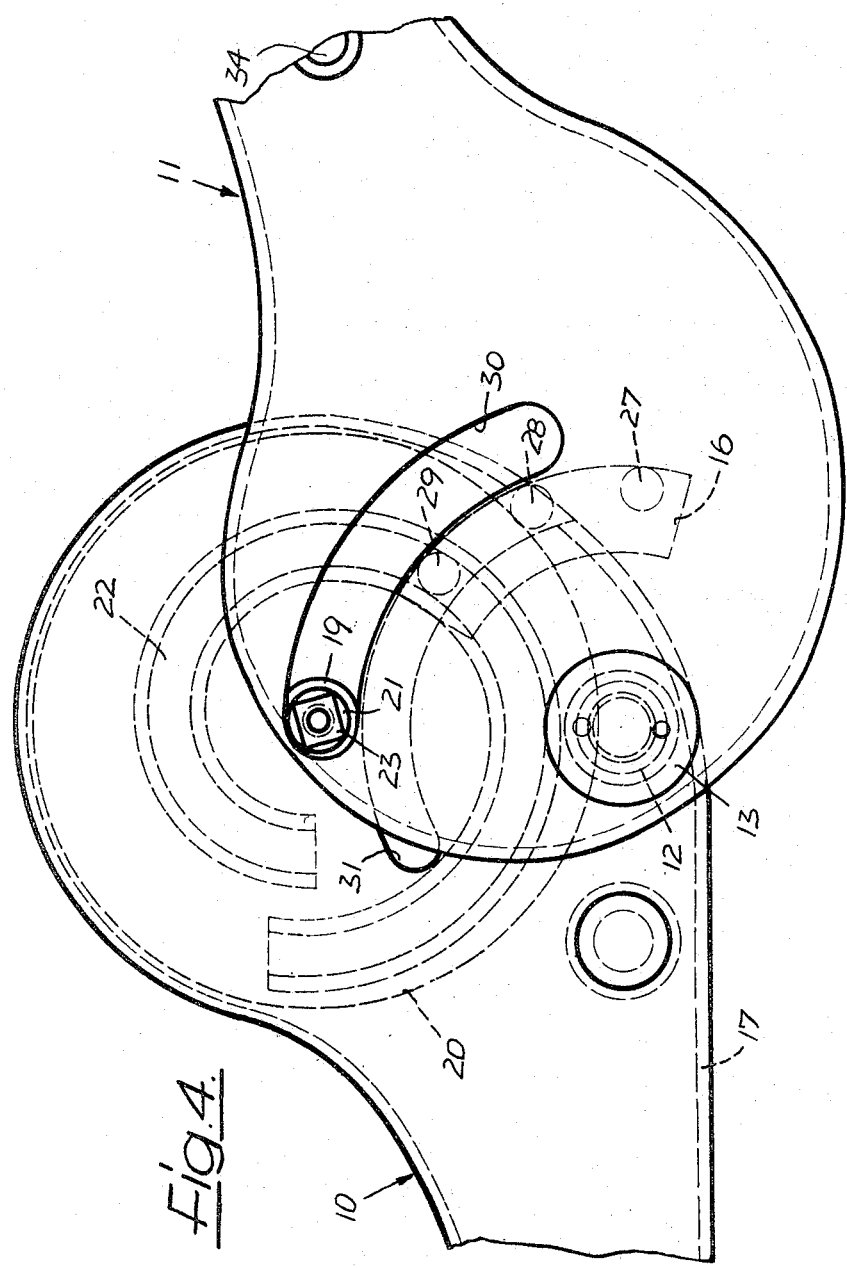

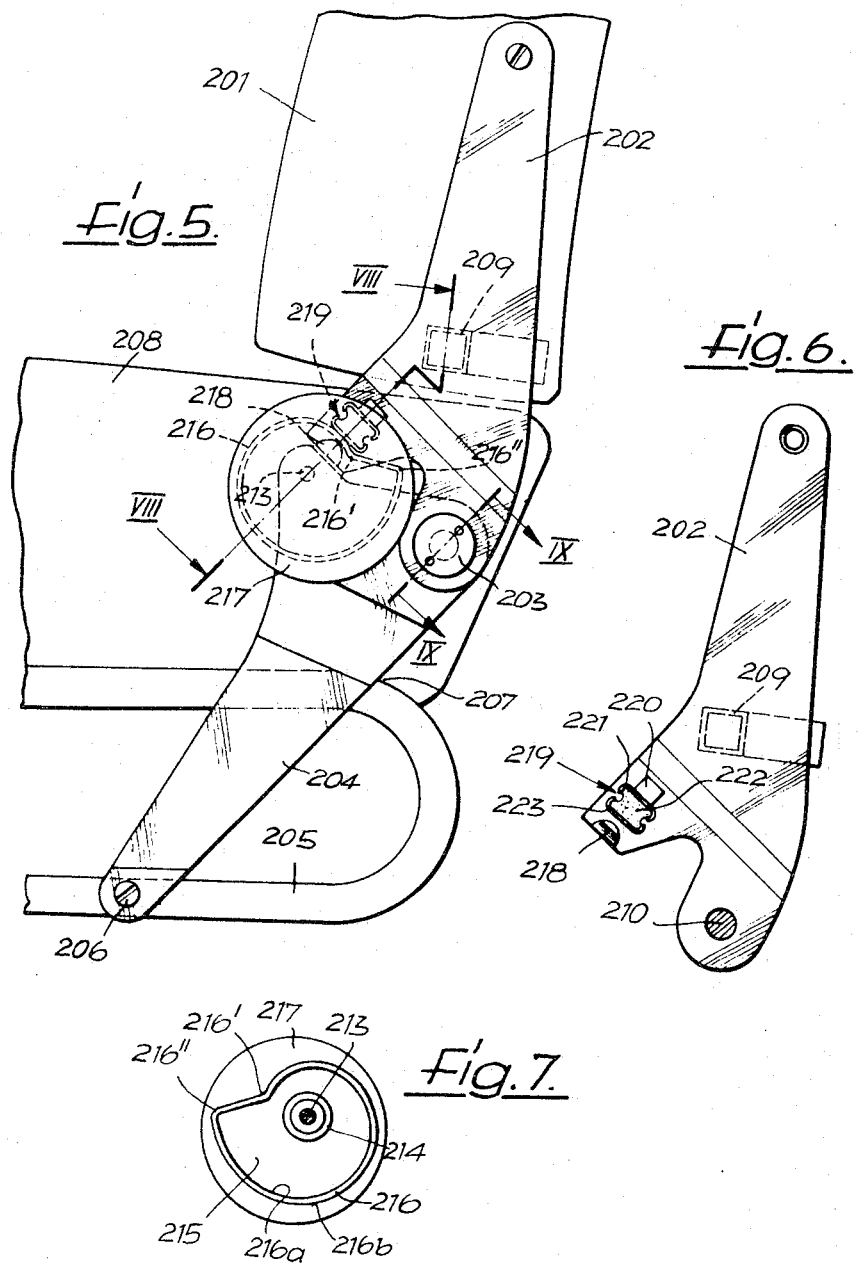

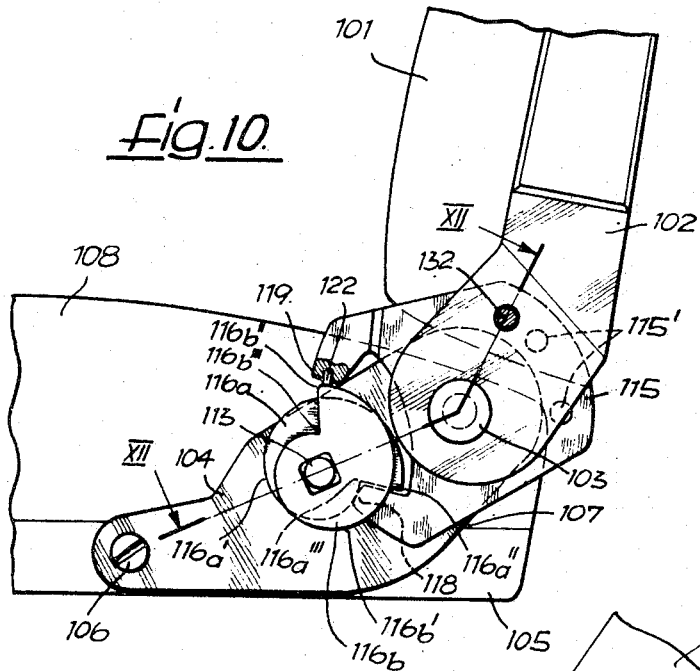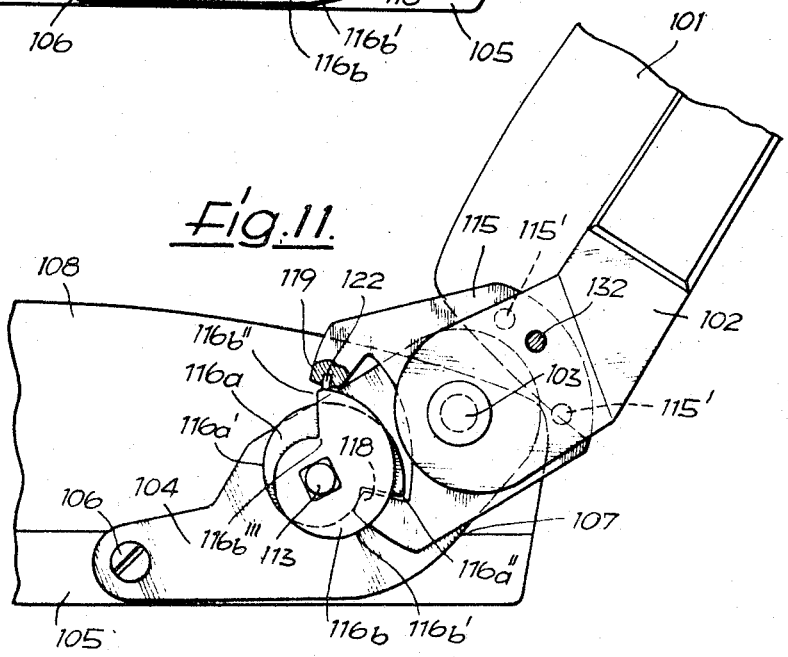

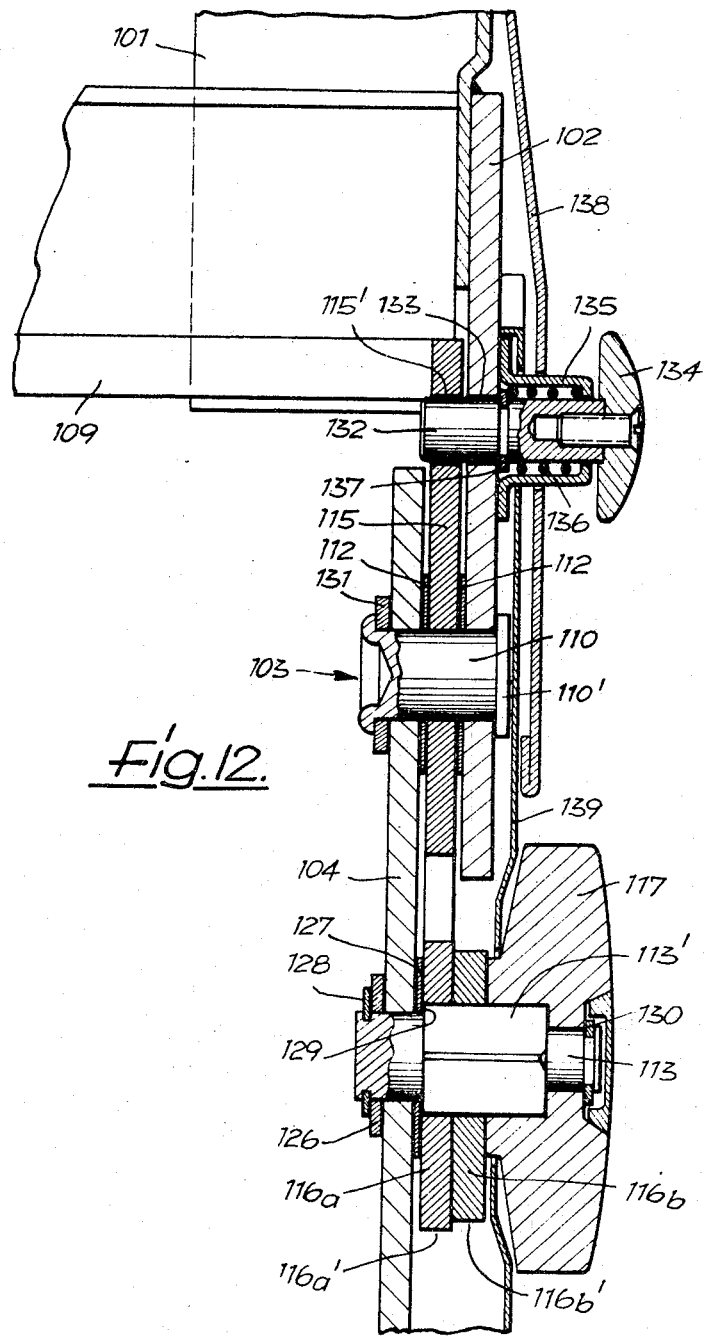

United States Patent Office 3,315,298
Patented Apr. 25, 1967

3,315,298
HINGE FITTING FOR ADJUSTING THE INCLINATION OF THE BACK REST OF A SEAT, ESPECIALLY OF A MOTOR VEHICLE
Werner Strien, Fehrbellinerstrasse 39, Stuttgart-Weilimdorf, Germany; Jörg Resag, Epplestrasse 39-A, Stuttgart-Degerloch, Germany; Wolfgang Fussnegger, Neue Ramtelstrasse 125, Leonberg-Eltingen, Germany; Volker Schmerrheim, Markelstrasse 17, Stuttgart, Germany; and Sylvester von Sass, Lindenmannstrasse 20, Cologne-Gartenstadt-Nord, Germany
Filed Dec. 12, 1963, Ser. No. 330,200
Claims priority, application Germany, Aug. 16, 1963, R 35,916
18 Claims. (Cl. 16—146)

The present invention relates to a hinge fitting for adjusting the inclination of the back rest of a seat, especially of a motor vehicle, wherein a pair of such hinge fittings are mounted on both sides of the seat and each hinge fitting consists of two hinge members, one of which is associated with the frame of the seat and the other with the back rest, and both hinge members are pivotably connected to each other in a manner so that the hinge members of both fittings are pivotable about a common axis. In order to prevent the description of the invention from being too prolix, only one hinge fitting will hereafter be described, namely, that hinge fitting which is provided with special means for adjusting the angular position of the back rest which are not required on the other hinge fitting.

The principal objects of the present invention are to provide a hinge fitting which permits the inclination of the back rest of a seat to be infinitely varied, to permit such adjustments of the back rest to be carried out very easily and quickly, to design the hinge fitting so as to take up very little space and to permit the back rest to be adjusted within a large angular range. The present invention includes, however, also the concept that the infinitely adjustable means may be employed only for a fine adjustment of the back rest and that additional means may be provided for effecting a coarse adjustment.

It is another object of the invention to provide a hinge fitting one hinge member of which is provided with helical control means which are mounted so as to be rotatable about an axis extending parallel to the hinge axis, while the other hinge member is provided with fixed operating means which are operatively associated with the helical control means, and wherein the helical control means are adapted when being turned to move the operating means along a circular path about the hinge axis. If therefore the helical control means are rotatably mounted on the hinge member which is associated with the seat frame and they are rotated, the inclination of the back rest will be changed by the operating means which in this case are rigidly connected to the back rest.

A further object of the invention consists in designing the helical control means and the operating means which are associated therewith in such a manner that the back rest cannot move of its own accord relative to the seat when a force is unintentionally exerted upon the back rest, for example, by an impact upon the latter. This object may be attained by two different arrangements. According to one of these arrangements, the helical control means and the associated operating means are designed so as to be in self-locking engagement with each other, for example, like a self-locking screw connection. The term "self-locking" as used herein means in connection with the helical control means that at any point of the helix the pitch angle thereof which is formed, on the one hand, by the tangent applied on the helix and, on the other hand, by the line which extends perpendicular to the radius vector which is associated with this tangent, is smaller than the angle of friction which is the arc tangent of the friction factor of the operatively associated parts, that is, of the helical control means and the operating means.

A further object of the invention is to design the helical control means preferably in accordance with a logarithmic spiral, although it is also possible to design these means in accordance with a spiral of a different shape.

These and further features and advantages of the present invention will become more clearly apparent from the following detailed description thereof which is to be read with reference to the accompanying drawings, in which—

FIGURE 1 shows a side view of a hinge fitting according to a first embodiment of the invention in which the upper hinge member is in a position corresponding substantially to the upright position of the back rest;

FIGURE 2 shows a partly exploded cross section which is taken along line II—II of FIGURE 1;

FIGURES 3 and 4 show side views of the hinge fitting according to FIGURE 1 with the upper hinge member in two different angular positions;

FIGURE 5 shows a side view of a hinge fitting according to a modification of the invention;

FIGURE 6 shows a side view of the upper hinge member of the hinge fitting according to FIGURE 5 which carries the projections;

FIGURE 7 shows the helical guide element;

FIGURE 8 shows an enlarged partial cross section which is taken along the line VII—VII of FIGURE 5;

FIGURE 9 shows a partial cross section which is taken along the line IX—IX of FIGURE 5;

FIGURE 10 shows a side view of a hinge fitting according to a further modification of the invention from which a few parts which are not essential to the description are omitted;

FIGURE 11 shows another side view of the hinge fitting according to FIGURE 10, but with the back rest in a different angular position; and FIGURE 12 shows an enlarged cross section which is taken along the line XII—XII in FIGURE 10.

Referring first to FIGURES 1 to 4 of the drawings, the hinge fitting according to the first embodiment of the invention comprises a lower hinge member 10 which is associated with a seat, for example, of a car, and an upper hinge member 11 which is associated with the back rest. On the lower hinge member 10 a journal 12 is secured which forms the swivel axis of the back rest and on which the upper hinge member 11 is rotatably mounted. In order to prevent the upper hinge member from sliding in the axial direction on the journal 12, it is locked thereon by a screw 13 which is screwed into the internal thread of the tubular journal 12.

The lower hinge member 10 consists of an inner shell 14 with a cylindrical rim 15 and an outer shell 16 which likewise has a cylindrical rim 17. In the assembled condition, the inner and outer shells together form a housing and the rim 17 overlaps the rim 15. Both the inner and outer shells 14 and 16 have a bushing 18 or 19, respectively, for receiving a shaft 21 which is nonrotatably connected to a disk 20 and extends parallel to the journal 12. Disk 20 carries a helically shaped channel member 22 the riblike arms of which extend at right angles to the side of disk 20 facing the upper hinge member 11. As shown in FIGURE 2, channel 22 has a U-shaped cross section. Shaft 21 extends through an arcuate aperture 30 in the upper hinge member 11 which extends coaxially to the swivel axis of the back rest and is rigidly connected to a knob 25 by means of a square head 23 and a screw 24. Knob 25 and screw 24 are not shown in FIGURES 1, 3, and 4 for the sake of clarity of the illustration.

The upper hinge member 11 carries a segment 26 which is coaxial to the swivel axis of the back rest and carries three cylindrical projections 27, 28, and 29 which are equally spaced from each other and are also equally spaced radially from the swivel axis of the back rest. The distance between each pair of adjacent projections 27 and 28 or 28 and 29 is equal to the pitch of the helical guide 22. These projections extend through an arcuate aperture 31, which is coaxial to the swivel axis of the back rest and provided in the outer shell 16 of the lower hinge member 10, and then into the space between the inner and outer shells 14 and 16 of the lower hinge member 10, and they are provided for engaging into the channel 22 the lateral inner walls of which extend parallel to each other in a helical direction. The axes of the two spirals coincide with the axis of shaft 21. Generally only one of the projections 27 to 29—in FIGURE 1 it is the projection 27—is in engagement with the channel 22.

If disk 20 and thus the channel 22 is turned by hand, for example, in the counterclockwise direction according to FIGURE 1 by means of the knob 25, the projection 27 which then engages into the channel 22 will move in the clockwise direction along a circle around the swivel axis of the back rest. Since the projection 27 is secured to the upper hinge member 11, the latter will then likewise be turned in the clockwise direction about the swivel axis of the back rest. When channel 22 is further turned, it finally reaches a position as shown in FIGURE 3, in which the projection 27 engages with the outer end of channel 22, while the next projection 28 has entered the inner end of channel 22. When channel 22 is still further turned, the projection 27 leaves the channel 22 and the positive transmission of the adjusting movement is continued by the projection 28.

As illustrated in FIGURES 1, 3, and 4, the helical channel 22 preferably extends approximately for an angular distance greater than 360° by such an angle as is formed by two radial vectors of the spiral which enclose one projection. It is therefore evident that there will always be a positive engagement between the projection and the helical channel since one projection always enters the channel at one end before the preceding projection leaves the channel at the other end.

The size of the pitch of the helical guide channel is limited upwardly due to the fact that the unit consisting of the channel and the projections should have a self-locking action. This applies if the lead angle is smaller than the angle of friction. The lead angle $\alpha$ is that angle which, as shown in FIGURE 1, is formed at any point of the spiral between the normal line N intersecting at a point P on the spiral at right angles to a vector L and the tangent T of this point of intersection P. The angle of friction is the arc tangent of the friction factor.

The pitch of the helical guide channel may be increased if the projections and the channel are made of materials which have a high friction factor. Since it is desirable to be able to pass through the entire range of adjustment of the back rest with as few revolutions of disk 20 as possible, the channel is preferably made in the form of a logarithmic spiral since the lead angle is identical at any point of such a spiral so that the available angle of friction in the helical guide channel can always by fully utilized. It is, however, also possible to employ a different kind of spiral for example, an Archimedean spiral.

Since the lead angle of the helical channel depends upon the friction factor, a large range of adjustment would mean that the channel would have to be very long if only one projection is used. This would also require the entire hinge fitting to be very large and larger than the space which is usually available for it. It is therefore advisable as shown in the drawings to provide three projections which permit the helical guide channel to be made of only one third of the length which would be required if only one projection were provided.

Disk 20 may be additionally locked against any undesired adjustment by means of a resilient element 32, as shown in FIGURE 2, which presses upon the rear side of disk 20. For the same purpose it is also possible to make the bushings 18 and 19 as well as the shaft 21 of materials with a high friction factor.

In order to facilitate the operation of raising the back rest, for which purpose it is necessary to turn the disk 20 in the clockwise direction, as seen in FIGURES 3 and 4, it is also possible to provide a conventional return spring which balances the weight of the back rest.

For holding the two sides of the back rest, which should be of a nondistortable construction, parallel to each other in any angular position, it is only necessary to connect the hinge members 11 of both hinge fittings rigidly to each other, for example, by means of a connecting rod 34, as shown in FIGURE 3. The equal movement of these two hinge members 11 may be attained by rigidly connecting the square ends 33 on the inner ends of the shafts 21 of the two fittings with each other.

Instead of having a round cross section as illustrated, the projections 27, 28, and 29 may also be made of a shape which complies as much as possible with the curvature of the helical channel, so that the forces will not be transmitted from one part to the other by mere points or lines of engagement but by a contact between surfaces.

The hinge members 10 and 11 which are pivotably connected to each other have to be provided at both sides of a seat, whereas the helical guide channel is required only at one side.

FIGURES 5 to 9 illustrate a hinge fitting according to a modification of the invention. This hinge fitting comprises a hinge member 202 which is rigidly connected to the back rest 201, and a hinge member 204 which is pivotably connected to the first hinge member 202 by means of a joint 203 and to the seat frame 205 by a pivot in the form of a bolt 206. It is further supported in a conventional manner, not particularly shown, on a point of the seat frame 205, for example, at 207, which is spaced from bolt 206. On the other side of the seat 208, a similar pair of hinge members is mounted in the corresponding position and the hinge members 202 of the two hinge fittings which support the back rest are rigidly connected to each other, for example, by a pipe 209 of a square cross section. As shown particularly in FIGURE 9, joint 203 comprises a threaded bolt 210 which is screwed into a nut 211 and has a shoulder 210'. Between nut 211 and shoulder 210' a washer 212 is inserted which has a larger diameter than this nut and shoulder. Bolt 210 and nut 211 carry the hinge members 202 and 204, respectively, which are held thereon by a head 210'' on the bolt and a flange 211' on the nut.

The helical guide means as subsequently described are provided on at least one side of the car seat.

The hinge member 204 has rigidly thereon a pin 213 which extends parallel to the axis of the joint 203 and carries a bushing 214 to which a disk 215 is secured the rim of which projecting at a right angle thereto forms a riblike cam member 216 which faces the two hinge members and has the shape of a spiral the ends 216' and 216'' of which are connected by a straight rib portion. Disk 215 is rigidly connected to a caplike head 217 which covers the pin 213 and serves as a knob for turning the riblike cam member 216 about the axis of pin 213 which coincides with the axis of the spiral.

This riblike cam member 216 has an inner peripheral helical surface 216a and parallel thereto an outer peripheral helical surface 216b. The inner helical surface 216a engages with a knoblike projection 218 which is secured to the hinge member 202 and may have a shape of a spherical or cylindrical segment. The outer helical surface 216b engages with a second projection 219 which consists of a block 220 or the like which is rigidly secured to the hinge member 202 and to which, in turn, a socket 221 of sheet metal or the like is secured which grips one side of an elastic cushion 222, for example, of rubber, while the other side of the cushion is gripped by a similar socket 223 which engages upon the outer helical surface 216b of the cam member 216.

When the riblike cam member 216 with its helical outer surfaces 216a and 216b is turned in one or the other direction by means of the knob 217, the projections 218 and 219 which engage with these surfaces, and thus also the hinge member 202 which is rigidly connected to these parts 218 and 219 will be swiveled in the corresponding direction about the axis of the joint 203. Small geometric inaccuracies of the construction insofar as the engagement of the projections 218 and 219 with the cam member 216 is concerned are compensated by the resilience of the cushion 222.

In order to prevent the disk 215 carrying the riblike cam member 216 from turning of its own accord, a ring 224′ which preferably consists of plastic is fitted into an annular groove 224 in pin 213 in such a manner as to exert a brake action upon the bushing 214.

For effecting a coarse adjustment of the inclination of the back rest without employng the helical guide member, the bushing 214 which carries the disk 215 with the helical riblike cam member 216 thereon may be shifted axially along pin 213 against the action of a spring 225 by pulling the knob 217 outwardly until the bushing 214 engages upon a washer 225′ on the end of pin 213 and the cam member 216 will be disengaged from the projections 218 and 219. After the back rest 201 has been pivoted roughly to a position near the desired angle without being guided by the helical cam member 216, the latter after being appropriately turned may again be engaged with the projections 218 and 219, whereupon a fine adjustment of the angle of the back rest may be carried out in the manner as previously described.

FIGURES 10 to 12 illustrate a further embodiment of the invention in which the hinge fitting comprises a hinge member 102 which supports the back rest 101 and a hinge member 104 which is pivotably connected to the hinge member 102 by a joint 103 and also to the seat frame 105 carrying the seat 108 by a pivot in the form of a bolt 106. Hinge member 104 which is pivotable about the axis of bolt 106 rests in a conventional manner, not specifically shown, on the seat frame 105 at another point, for example, at 107. The same arrangement of elements is provided on the other side of the seat, and the two hinge members 102 at the two sides of the back rest are rigidly connected to each other by a rod 109 or the like.

The helical guide element as hereafter described is provided at least at one side of the seat.

The hinge member 104 carries a journal 113 which is mounted thereon so as to be rotatable but not movable in the axial direction by being provided on its end with two washers 126 and 127 which are mounted at the opposite sides of the hinge member 104 and one of which, the washer 126, is held in place on the end of journal 113 by a spring ring 128 or the like, while the other washer 127 is held in place by a shoulder 129 on journal 113. This shoulder is formed by the end of the central part 113′ of journal 113 which is made of a square cross section. This square central part 113′ carries a pair of disks 116a and 116b and a control knob 117 which is rigidly secured on journal 113 by another spring ring 130.

Each of the two disks 116a and 116b is provided with a helical peripheral surface 116a′ or 116b′, respectively, each of which has a pitch which is directed inversely to that of the peripheral surface of the other disk. The ends 116a″ and 116‴ of the spiral of disk 116a and the ends 116b″ and 116‴ of the spiral of disk 116b are respectively connected by a peripheral part which substantially extends in the direction of a radius vector. The helical peripheral surfaces 116a′ and 116b′ may have a shape of an Archimedean or logarithmic or other suitable spiral.

Each helical surface 116a′ and 116b′ engages with a propection 118 or 119, respectively, at least one of which, in the present case the projection 119, is provided with an elastic cushion 122 which directly engages upon the associated helical surfaces 116b.

The two projections 118 and 119 are formed by the ends of a bifurcated arm of a two-armed lever in the form of a plate 115 which is pivotably mounted on the pivot pin 110 of the joint 103, on which pin also the hinge members 102 and 104 are mounted at the opposite sides of plate 115. Washers 112 are inserted between the two hinge members 102 and 104 and the disk 115, and all rotatable parts on pivot pin 110 are located between the head 110′ of this pin and a washer 131. Pivot pin 110 is designed in a conventional manner so as to permit the parts to be easily slipped thereon.

The second arm of the lever as formed by plate 115 which is pivotable about the pivot pin 110 of joint 103 has a plurality of bores 115′ which are located on an arc about the axis of joint 103 and through either of which a pin 132 may be inserted which also passes through a bore 133 in the hinge member 102 and is provided with a control knob 134. Pin 132 may be withdrawn from the respective bore 115′ in which it is located against the action of a spring 136 which is held in a socket 135 which is secured to the hinge member 102 and in which spring 136 acts at one end upon the end flange of the socket and at the other end upon a spring ring 137 which is inserted into an annular groove in pin 132. When by means of the knob 134 pin 132 is fully withdrawn from the mentioned bore 115′ in plate 115 against the action of spring 136, hinge member 102 on the back rest may be swiveled about the joint 103 so far that pin 132 will snap into another bore 115′ in disk 115. It is thus possible to effect a coarse adjustment of the inclination of the back rest 101. Intermediate the positions of the back rest which are determined by the bores 115′ it is possible to effect a fine adjustment of the inclination of the back rest by turning the knob 117 in one or the other direction and by thereby turning the disks 116a and 116b with the helical cam surfaces 116a′ and 116b′, whereby the projections 118 and 119/122 which engage with these cam surfaces and therefore also the plate 115 and the back rest 101 are swiveled which is rigidly secured to this plate by the pin 132. The points of contact of the projections 118 and 119/122 with the associated cam surfaces 116a′ and 116b′, respectively, are located approximately on an arc which is drawn about the axis of rotation of plate 115, that is, the axis of the joint 103, and which extends at least approximately through the spiral axis, i.e. the axis of pin 110. The entire hinge fitting with the exception of the control knobs 117 and 134 is covered toward the outside cover plates 138 and 139.

Although our invention has been illustrated and described with reference to the preferred embodiments thereof, we wish to have it understood that it is in no way limited to the detials of such embodiments, but is capable of numerous modifications within the scope of the appended claims.

We claim:

1. A hinge fitting for adjusting the inclination of the back rest of a seat, especially of a motor vehicle, comprising a pair of hinge members associated with the seat frame and with the back rest, respectively, and adapted to be pivoted relative to each other about a hinge axis, a helical cam member consisting of a disk rotatably mounted on one of said hinge members and having a first rib mounted on and projecting at right angles from one of its surfaces, at least the outer peripheral surface of said first rib having a helical shape, the axis of rotation of said disk and the axis of said rib coinciding with each other and extending parallel to said hinge axis, means nonrotatably connected to said cam member for turning the same about said disk axis, at least one projection secured to the other hinge member and adapted to slide along said outer peripheral helical surface of said first rib, and means for maintaining said projection in engagement with said helical surface, said last means comprising a second rib mounted on and projecting at right angles from said disk, at least the inner peripheral surface of said second rib having a helical shape and extending parallel to the outer periphery of said first rib and spaced therefrom at a distance substantially equal to the thickness of said projection and facing said outer periphery of said first rib so that said two ribs together with said disk form a helical channel in which at least one projection is guided.

2. A hinge fitting as defined in claim 1, in which a plurality of said projections are secured to said other hinge member and are disposed on an arc about said hinge axis and each spaced from the other at a distance equal to the size of the pitch of said helical channel, said channel having an arcuate length greater than 360° substantially by an angle formed by two radial vectors of said channel enclosing one projection.

3. A hinge fitting as defined in claim 1, in which said projection engages into said channel so as to be self-locking therein.

4. A hinge fitting for adjusting the inclination of the back rest of a seat, especially of a motor vehicle, comprising a pair of hinge members associated with the seat frame and with the back rest, respectively, a first axle member for pivotably connecting the two hinge members to each other, one of said hinge members consisting of two shells having their inner sides facing each other and removably connected to each other so as to form a housing, a second axle member mounted in said shells of said housing parallel to said first axle member and having one end extending through an arcuate slot in the other hinge member extending arcuately about said first axle member, means for turning said second axle member and secured to the end of said second axle member projecting through the other hinge member, a disk non-rotatably secured to said second axle member within said housing and having an arcuate channel with the open side thereof facing the other hinge member, the axis of said helical channel coinciding with the axis of said second axle member, at least one projection secured to the other hinge member and extending through an arcuate slot extending arcuately about the axis of said first axle member and provided in the shell of the first hinge member adjacent to the other hinge member, said projection engaging into said channel and adapted, when said second axle member is being turned together with said disk and said channel, to slide along said channel while being guided by said ribs forming said channel.

5. A hinge fitting for adjusting the inclination of the back rest of a seat, especially of a motor vehicle, comprising a pair of hinge members associated with the seat frame and with the back rest, respectively, and adapted to be pivoted relative to each other about a hinge axis, a disk rotatably mounted on one of said hinge members so as to be rotatable about an axis parallel to said hinge axis, said disk having a helical rib of an equal thickness at all points thereof and projecting at right angles from said disk, the axis of said helical rib coinciding with said axis of said disk, means non-rotatably connected to said disk for turning the same, two projections connected to the other hinge member substantially on a radius vector of said helical rib and at such a distance from each other that, when said hinge members are pivoted relative to each other about said hinge axis upon turning of said disk, said rib can slide between said projections with only a slight play between said projections and said rib.

6. A hinge fitting as defined in claim 5, in which the ends of said helical rib are connected to each other by a nonhelical rib portion so that said rib forms a closed cam member.

7. A hinge fitting as defined in claim 5, in which said disk is slidable along its axis extending parallel to said hinge axis so as to disengage said rib from said projections.

8. A hinge fitting for adjusting the inclination of the back rest of a seat, especially of a motor vehicle, comprising a pair of hinge members associated with the seat frame and with the back rest, respectively, a first axle member for pivotally connecting the two hinge members to each other, a second axle member having one end secured to one of said hinge members parallel to said first axle member, a bushing rotatable on and slidable axially along said second axle member, a disk rigidly connected to said bushing and having a helical rib of an equal thickness at all points thereof and projecting at right angles from said disk, two projections connected to the other hinge member substantially on a radius vector of said helical rib and at such a distance from each other that, when said hinge members are pivoted relative to each other about said first axle member upon turning of said disc, said rib can slide between said projections and said rib, a cap-like control knob rigidly connected to said disk and covering said second axle member for turning said disk and said bushing and sliding the same in the axial direction, a washer secured to the free end of said second axle member, and a compression spring mounted between said disk and said washer and adapted to maintain said rib in engagement with said projections.

9. A hinge fitting as defined in claim 8, in which said second axle member has an annular groove, and a brake ring fitted into said groove and projecting beyond the periphery of said second axle member and adapted to exert a brake effect upon said bushing.

10. A hinge fitting for adjusting the inclination of the back rest of a seat, especially of a motor vehicle, comprising a pair of hinge members associated with the seat frame and with the back rest, respectively, and adapted to be pivoted relative to each other about a hinge axis, a pair of disks each having a helical peripheral surface of a pitch inverse to the pitch of the peripheral surface of the other disk, said disks being nonrotatably connected to each other and together rotatably mounted on one of said hinge members so as to be rotatable about a common axis extending parallel to said hinge axis, means nonrotatably connected to said disks for turning the same, two projections connected to the other hinge member and located substantially on an arc about said hinge axis and each associated with one of said disks and together adapted to embrace said disks in such a manner that, when said hinge members are pivoted relative to each other about said hinge axis, only a slight play will exist between said projections and the peripheral surfaces of said disks.

11. A hinge fitting as defined in claim 10, in which the ends of the helical peripheral surface of each of said disks are connected to each other by a peripheral part extending radially to the axis of said disk.

12. A hinge fitting as defined in claim 10, further comprising a shaft rotatably mounted on said one of said hinge members and extending parallel to said hinge axis, and said means including a control knob, the part of said shaft projecting from said hinge member having a square cross section, said helical disks and said control knob being mounted on said square part.

13. A hinge fitting for adjusting the inclination of the back rest of a seat, especially of a motor vehicle, comprising a pair of hinge members associated with the seat frame and with the back rest, respectively, a first axle member for pivotably connecting said hinge members to each other, a pair of disks having helical peripheral surfaces each having a pitch inverse to the pitch of the helical surface of the other disk, said disks being nonrotatably connected to each other and together rotatably mounted on one of said hinge members so as to be rotatable about a common axis extending parallel to said first axle member, means nonrotatably connected to said disks for turning the same, a plate rotatably mounted on said first axle member so as to form a two-armed lever one arm of said lever being bifurcated and the two ends of said arm forming projections disposed substantially on an arc around the axis of said first axle member and each adapted to engage with the helical peripheral surface of one of said disks and together adapted to embrace said disks in such a manner that when said hinge members are pivoted relative to each other about the axis of said first axle member upon turning of said discs, only a slight play will exist between said projections and said disks, the other arm of said lever being adapted to be selectively connected to the other hinge member in different angular positions of said hinge members relative to each other.

14. A hinge fitting for adjusting the inclination of the back rest of a seat, especially of a motor vehicle, comprising a pair of hinge members associated with the seat frame and with the back rest, respectively, and pivotally connected to each other so as to be pivotal relative to each other about a hinge axis, a helical cam member consisting of a disk rotatably mounted on one of said hinge members and having a rib mounted on and projecting at right angles from one of its surfaces, at least the outer peripheral surface of said rib having a helical shape, the axis of rotation of said disk and the axis of said rib coinciding with each other and extending parallel to said hinge axis, means nonrotatably connected to said cam member for turning the same about the disk axis, at least one projection secured to the other hinge member and adapted to slide along said outer peripheral helical surface of said rib, and means for maintaining said projection in engagement with said helical surface.

15. A hinge fitting as defined in claim 14, in which said helical rib has such a pitch that at any point of the helical surface thereof the lead angle formed by the tangent applied on said surface and by a line extending at a right angle to the radius vector is smaller than the arc tangent of the friction factor.

16. A hinge fitting as defined in claim 14, in which said helical surface of said rib has a shape of a logarithmic spiral.

17. A hinge fitting for adjusting the inclination of the back rest of a seat, especially of a motor vehicle, comprising a pair of hinge members associated with the seat frame and with the back rest, respectively, and adapted to be pivoted relative to each other about a hinge axis, a helical cam member consisting of a disk rotatably mounted on one of said hinge members so as to be rotatable about its axis extending parallel to said hinge axis, said disk having a rib mounted on and projecting at right angles from one of its surfaces, said rib having two parallel helical peripheral surfaces, means nonrotatably connected to said cam member for rotating the same about said common axis, and two projections connected to the other hinge member and each associated with and adapted to slide along one of said helical surfaces respectively, said two projections being adapted substantially to engage with said helical surfaces so that, when said hinge members are pivoted relative to each other about said hinge axis, there is only a slight play between said projections and said helical surfaces.

18. A hinge fitting as defined in claim 17, in which one of said projections at least partly consists of an elastic material.

References Cited by the Examiner

UNITED STATES PATENTS

| | | | |
|---|---|---|---|
| 696,756 | 4/1902 | Rundquist | 74—527 X |
| 2,197,284 | 4/1940 | Wooster | 74—527 |
| 3,099,485 | 7/1963 | Beierbach et al. | |

FOREIGN PATENTS

| | | |
|---|---|---|
| 42,252 | 3/1933 | France. |
| 751,894 | 4/1952 | Germany. |
| 501,620 | 11/1954 | Italy. |

MARVIN A. CHAMPION, *Primary Examiner.*

RICHARD E. MOORE, *Examiner.*